P. L. BROCKARDT.
AUTOMATIC CENTERING DEVICE FOR ENDLESS APRONS.
APPLICATION FILED JULY 6, 1909.
977,702.
Patented Dec. 6, 1910.
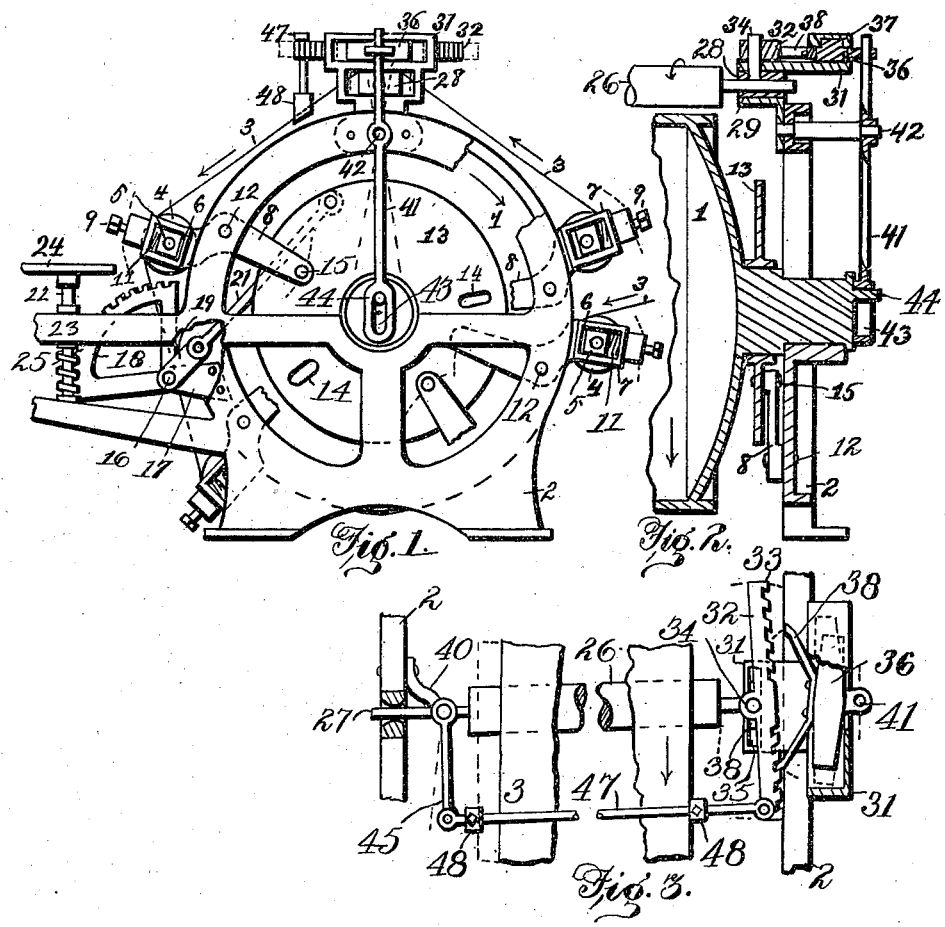
Witnesses.
Paul L. Brockardt, Inventor
By Robert S. Carr,
Atty.

UNITED STATES PATENT OFFICE.

PAUL L. BROCKARDT, OF HAMILTON, OHIO.

AUTOMATIC CENTERING DEVICE FOR ENDLESS APRONS.

977,702.  Specification of Letters Patent.  Patented Dec. 6, 1910.

Original application filed August 12, 1908, Serial No. 448,113. Divided and this application filed July 6, 1909. Serial No. 506,205.

*To all whom it may concern:*

Be it known that I, PAUL L. BROCKARDT, a citizen of the United States, residing at Hamilton, Ohio, have invented a new and useful Improvement in Automatic Centering Devices for Endless Aprons, of which the following is a specification.

My invention relates to automatic centering devices for endless aprons of the class wherein the linen is carried between the face of a rotative cylindrical drier and an endless apron whereon pressure is exerted at intervals by means of pressure rolls.

This application is a divisional continuation of my application for improvement in mangles filed August 12, 1908, and numbered 448,113, and my invention relates to automatic centering devices for endless aprons and the objects of my improvements are to provide automatic pawl and ratchet mechanism for moving the guide roll in different angles whereby the apron is caused to travel in proper lateral position; and to provide simple and durable construction and assemblage of parts for securing facility of operation and efficiency of action. These objects are attained in the following described manner, as illustrated in the accompanying drawings, in which:—

Figure 1 is an end elevation with parts broken away of my improved device as applied to a mangle apron; Fig. 2, a longitudinal vertical section with parts broken away, and Fig. 3, a plan with parts broken away showing the automatic mechanism for moving the guide roll in different angles to the direction of the apron.

In the drawings, 1 represents the hollow cylindrical drier of a mangle and journaled at its respective ends on supporting frames 2, 3 portions of an endless apron partially encircling the drier under the pressure rollers 4 and arranged to travel in the direction of the arrows. Said rollers are journaled at their respective ends in bearings 5 which are slidably mounted in slots 6 formed in housings 7, said housings each forming one end portion of a lever 8 which is turned to form an obtuse angle at an intermediate point in its length and provided with an adjusting screw 9 for regulating the pressure of coil springs 11 whereby the said bearings are maintained under a yielding pressure against the bottom of slots 6 in the ordinary manner. The levers 8 are ful- crumed at their angular point on the respective bolts 12 which are secured at intervals on the end frames and equidistant from the axis of the drier.

Disks 13 rotatably adjustable on the respective journals of the drier are formed with a series of radial slots 14 corresponding with the respective levers 8 for the movable engagement therein of pins or anti-friction rollers 15 which project laterally from the inner end portion of said levers.

A shaft 16 journaled at its ends in bearings 17 secured to the supporting frames is provided with a segmental rack 18 and with crank arms 19 which are connected with the respective disks near one edge by means of rods 21. A shaft 22 journaled in bearings on a bracket 23 which projects from one of the end supporting frames is provided with a hand wheel 24 and with a worm pinion 25 in engagement with the rack 18. A guide roll 26 for the apron is swiveled at one end in one of the end frames at 27 and journaled at the other end in a bearing 28 which is slidably mounted in a slot 29 in bracket 31 secured on the opposite end frame. A rack bar 32 formed with teeth 33 is mounted to oscillate on a pin 34 which is extended from bearing 28 through a slot 35 formed in bracket 31. A block 36 mounted to both slide and oscillate in a grooved slot 37 formed in bracket 31 is provided with fixed pawls 38 which are extended at angles in respective opposite directions from one side of said block and adapted to detachably engage alternately with the teeth 33 on the corresponding end of bar 32.

A lever 41 mounted to oscillate on a stud 42 which projects from the corresponding end frame is pivotally connected near one end with block 36 on the opposite side thereof from the pawls and formed with a slot 43 in its other end adapted to engage with the eccentric pin 44 which projects from the end of the corresponding journal of the drier. An arm 45 is pivotally secured on one end frame by means of a bracket 46 and a transverse rod 47 connects one end of the rack bar 32 therewith. Stops 48 adjustably secured on said rod depend therefrom adjacent to and below the corresponding opposite edges of the endless apron.

The oscillation of the lever with the rotation of the drier first oscillates the block with the pawls thereon alternately toward the rack bar and then reciprocates it longitudinally without causing the engagement of either pawl with said bar while it remains parallel with the end frame. A predetermined lateral movement of the apron causes one of its edges to contact with the corresponding stop and thereby oscillate the rack bar sufficiently for the corresponding pawl to engage with the teeth on one of its end portions whereby the bearing is shifted in the slot in the bracket for changing the angle of the guide roll on the apron, whereby it is guided to contact with the opposite stop and move the opposite end portion of the rack bar to engage with the other pawl. In this manner the lateral movement of the apron is automatically limited by the position of the stops.

Having fully described my improvements, what I claim as my invention and desire to secure by Letters Patent of the United States is:

1. An automatic centering device for endless aprons comprising a movable bearing, a guide roll journaled at one end therein, a rack bar mounted to oscillate on the bearing, a block provided with a pawl adjacent to the rack, means actuated by the lateral movement of the apron for oscillating the rack in a plane with the pawls, and lever mechanism arranged for alternately oscillating the block for engaging and disengaging the pawl with the rack and for sliding the block with the rack.

2. An automatic centering device for endless aprons comprising a movable bearing, a guide roll journaled at one end therein, a rack bar mounted to oscillate on the bearing, a block provided on one side with pawls adapted to engage with opposite portions of the rack, means actuated by the lateral movement of the apron for oscillating the rack into engagement with either of the pawls, and lever mechanism arranged to alternately oscillate and slide the block for respectively engaging the pawls with the rack alternately and for moving the rack and bearing with the guide roll at different angles to the direction of the apron.

3. An automatic centering device for endless aprons comprising a bearing slidably mounted on a support, a transverse guide roll journaled at one end therein and contacting with the apron, a rack pivotally mounted at its center on the bearing, a transverse rod pivotally engaging with one end of the rack and provided with shoes arranged to contact alternately with the respective edges of the apron for moving the rod longitudinally with the rack in different horizontal angles, a block provided on one side with oppositely disposed pawls adapted to alternately engage with opposite end portions of the rack, and a lever for actuating the block.

P. L. BROCKARDT.

Witnesses:
A. J. DAVIDSON,
R. S. CARR.